July 21, 1964  D. W. BIRMINGHAM  3,141,694
SELF LOCKING STAY MECHANISMS
Filed Jan. 15, 1963  4 Sheets-Sheet 1
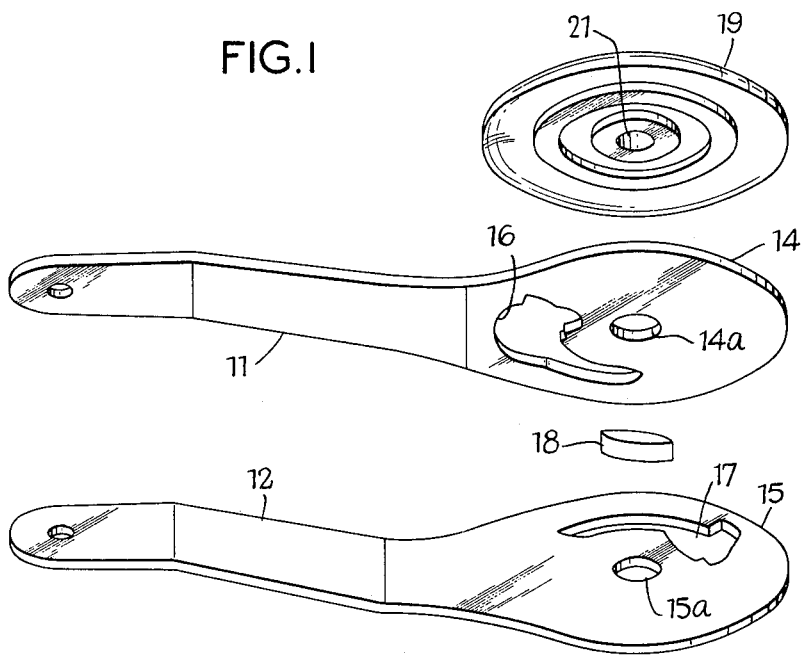
FIG.1
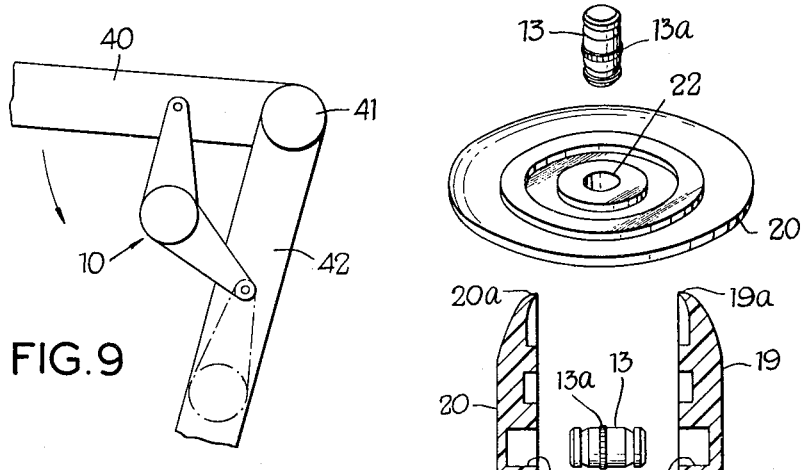
FIG.9
FIG.2
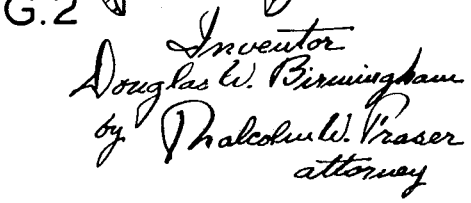
Inventor
Douglas W. Birmingham
by Malcolm W. Fraser
attorney July 21, 1964 D. W. BIRMINGHAM 3,141,694
SELF LOCKING STAY MECHANISMS
Filed Jan. 15, 1963 4 Sheets-Sheet 2

Inventor
Douglas W. Birmingham
by Malcolm W. Fraser
attorney

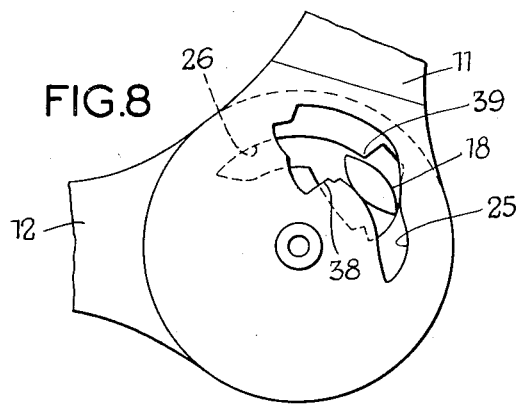
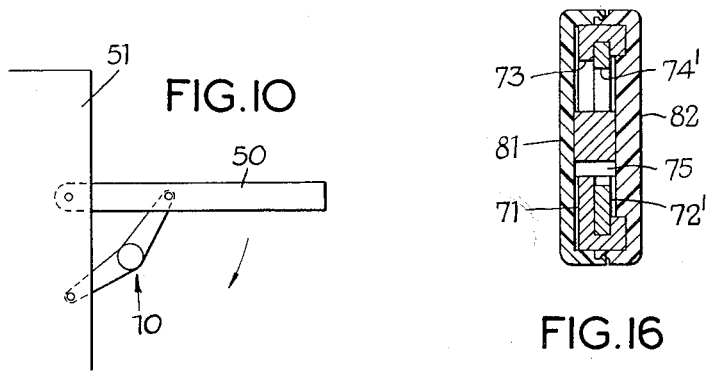
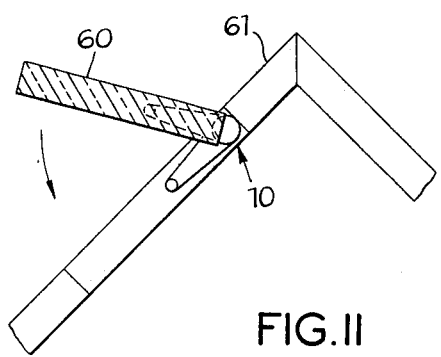

July 21, 1964  D. W. BIRMINGHAM  3,141,694
SELF LOCKING STAY MECHANISMS
Filed Jan. 15, 1963  4 Sheets-Sheet 4

Inventor
Douglas W. Birmingham
by Malcolm W. Fraser
attorney

United States Patent Office 3,141,694
Patented July 21, 1964

3,141,694
SELF LOCKING STAY MECHANISMS
Douglas William Birmingham, Ickenham, England, assignor to United-Carr Incorporated, a corporation of Delaware
Filed Jan. 15, 1963, Ser. No. 251,690
Claims priority, application Great Britain Jan. 17, 1962
7 Claims. (Cl. 292—263)

The present invention relates to an improved self-locking stay mechanism.

It is known in the automobile and other industries to provide a hinged or expanding stay mechanism, for instance on the window or boot of a car, which is such that, when it is fully opened and then released, the mechanism locks holding the window or boot open and when then again fully opened and released the mechanism unlocks so that the window or boot-lid can then be fully closed.

This type of locking stay mechanism has a wide application in many fields and it is an object of the present invention to provide an improved form of such mechanism which is simple in construction and reliable in use.

According to the invention there is provided a locking stay comprising a first member and a second member connected together by connecting means which permits, between the members, a defined relative movement in a forward and a reverse direction, each member being formed with a surface overlying a surface of the other member and slidable thereover during said relative movement of the members, and each surface being formed with a slot partially overlying and in register with the slot of the other surface, there being provided, yieldingly constrained to maintain its instantaneous position but otherwise floating, a double-ended pawl having its thickness accommodated partly in one slot and partly in the other slot, the slots being formed with bounding walls so shaped that on successive relative movements of the members alternately in the forward direction and in the reverse direction the pawl is cammed by the walls successively into progressively rotated positions, the pawl being engaged by the walls of the two slots, in a first and a third of said rotated positions, to prevent further relative movement of the members in the forward direction and, in the second of said rotated positions, to prevent further relative movement in the reverse direction, and the pawl, in the fourth of its said rotated positions, being generally aligned with the permitted direction of relative movement and with an extension in that direction of at least one of the slots, said extension permitting movement of the extended slot and of the associated member, relative to the aligned pawl and the other member, in the reverse direction to a relative position of the members which is substantially displaced, in the reverse direction of relative movement, from their relative position as limited, in that direction, by the pawl in its said second rotated position.

Preferred embodiments of a locking stay according to the invention will now be described with reference to the accompanying diagrammatic drawings, in which:

FIGURE 1 is an exploded perspective view of a self-locking, releasable locking stay in accordance with the invention;

FIGURE 2 is an elevation, partly in section, of component parts of the locking stay of FIGURE 1;

FIGURES 4 to 8 are plan views of part of the locking stay of FIGURE 1, illustrating five operative positions respectively;

FIGURE 9 is an elevation showing the locking stay shown in FIGURES 1 to 8, in its locked position and attached to two relatively displaceable bodies;

FIGURES 10 and 11 are elevations illustrating the locking stay shown in FIGURES 1 to 8, employed to support respectively a cabinet shelf and a sky light;

FIGURE 16 is a sectional view, corresponding to FIGURE 15, of yet another locking stay which is a slightly modified version of that shown in FIGURES 13 to 15.

Figure 3:
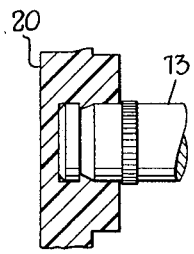
FIGURE 3 is a fragmentary view, partly in section, of two of the components shown in FIGURE 2, in their assembled relationship.

The locking stay illustrated in FIGURES 1 to 8 comprises first and second members in the form of arms 11 and 12, pivotally connected together, by connecting means which includes a pivot pin 13, so as to be capable of relative rotation about a common pivotal axis. The arms 11 and 12 are formed with disc-like ends 14 and 15 respectively of which, in the assembled stay, respective mutually adjacent surfaces overlie one another and are slidable over one another during such relative rotation of the arms. The pivot pin 13 is knurled, over part of its length at 13a, to make the pin a tight fit within a central aperture 15a, of the end 15 of the arm 12, so that the pin 13 does not rotate relative to the arm 12; a central aperture 14a of the end 14 of the arm 11 is a slidingly rotatable fit on the pin 13. The arms 11 and 12 are thus relatively pivotable about the axis of the pin 13.

The mutually adjacent surfaces of the disc-like ends 14 and 15 of the arms 11 and 12 are formed with slots 16 and 17 respectively which, partially, overlie and are in register with one another, and a floating double-ended pawl 18 is located within the slots, part of its thickness being accommodated in one of the slots and part in the other. In the embodiment of the invention illustrated in FIGURES 1 to 8, the slots 16 and 17 penetrate through the whole thickness of the ends 14 and 15 of the arms 11 and 12, though such complete penetration is not a necessary feature of the invention; and to retain the pawl in the slots there are provided a pair of caps 19 and 20 of somewhat resilient material formed with central bores 21 and 22 respectively in which the ends of the pivot pin 13 fit tightly. As shown in FIGURE 2 and, on a larger scale, in FIGURE 3, the ends of the pivot pin 13 are each formed with an annular groove of asymmetrical V-shape into which the material of the cap 19 or 20 projects, when the pin is inserted into the bore 21 or 22, to prevent easy removal of the cap thereafter. The peripheral edges 19a and 20a of the caps are of tapered thickness, and thereby relatively more resilient, and in the assembled stay they yieldingly bear against the outer surfaces of the disc-like ends 14 and 15 of the arms 11 and 12, to provide a dust seal. Each cap is also formed with an annular rib 23 or 24 and, in the assembled stay, these rigs bear against opposite surfaces of the pawl 18 and, since the caps are effectively non-rotatable relative to the pin 13 and the pin itself is non-rotatable relative to the arm 12, yieldingly maintain the pawl, by friction, in its instantaneous position relative to the arm 12. The caps 19 and 20 also serve, of course, to maintain the stay in its assembled condition.

Figure 4:
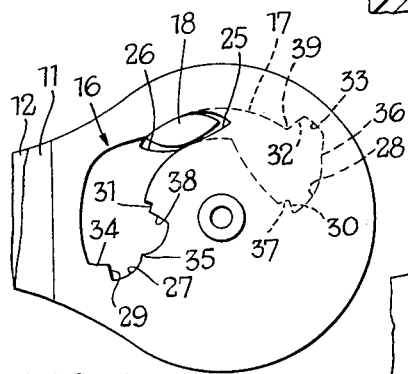
Figure 5:
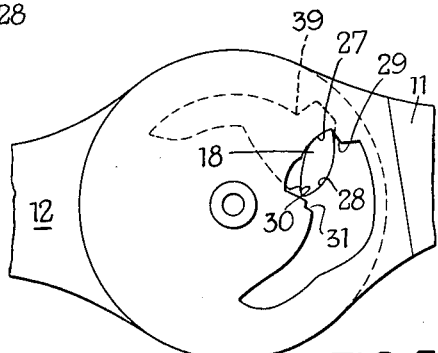
Figure 6:
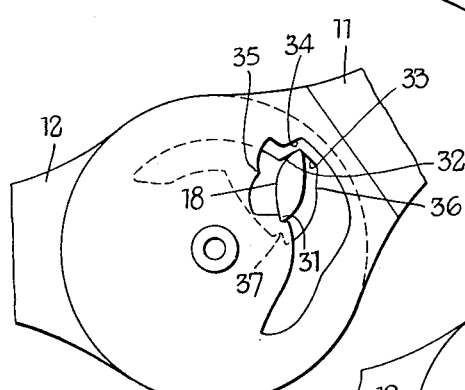

The detailed shapes of the slots 16 and 17, and their function, are illustrated in FIGURES 4 to 8. As shown in FIGURE 4, the slots extend round generally circular arcs about the common pivotal axis of the arms 11 and 12. In particular, each slot 16 or 17 has a portion 25 or 26 extending in the direction of relative pivotal movement, i.e. arcuately, these extensions overlying one another (in the relative position of the arms 11 and 12 shown in FIGURE 4) and accommodating the pawl 18. As the arm 11 is pivoted clockwise relative to the arm 12, the pawl 18, held frictionally by the caps 19 and 20, remains stationary relative to the arm 12 until one of its ends is engaged by a portion 27 of the wall of the slot 16. The pawl is then carried clockwise with the arm 11 until its other end engages the wall portion 28 of the slot 17; and when this occurs the wall portions 27 and 28, acting obliquely on opposite ends of the pawl, cam those ends in opposite directions and rotate the pawl clockwise into a first rotated position in which further clockwise rotation of the pawl is prevented by abutment of the ends of the pawl against stops constituted by wall portions 29 and 30 of the respective slots. In this first rotated position, with its opposite ends engaged (as shown in FIGURE 5) in two corners of the slots 16 and 17 formed by the wall portions 27 and 29, and 28 and 30 respectively, the pawl 18 prevents further clockwise pivotal movement of the arm 11 relative to the arm 12.

If, now, the arm 11 is pivoted in the reverse direction, i.e. anticlockwise, relative to the arm 12, the frictionally-engaged pawl 18 remains stationary relative to the arm 12 until its forward end is engaged in a corner 31 of the slot 16. When this occurs, the other end of the pawl has already been disengaged by the wall portions 28 and 30 of the slot 17. On continued anticlockwise pivotal movement of the arm 11, the engagement of the pawl by the corner 31 carries the pawl bodily anticlockwise also, and also, due to the frictional restraint on the pawl, tends to rotate it still further clockwise. This tendency of the frictional restraint to rotate the pawl may itself be fully effective to rotate the pawl into a second rotated position; but to the extent that the frictional restraint is not itself sufficient, engagement of the free end of the pawl (as it is moved bodily anticlockwise) with a wall portion 32 of the slot 17, and the camming action of the wall portion 32 on the free end of the pawl as the other end thereof continues to be acted on by the corner 31 of the slot 16, is effective to rotate the pawl into the said second rotated position (shown in FIGURE 6) in which it prevents further anticlockwise pivotal movement of the arm 11 relative to the arm 12 by engagement of its one end in the corner 31 of the slot 16 and by engagement of its other end in a corner of the slot 17 formed by the wall portion 32 and an adjacent wall portion 33.

Figure 7:
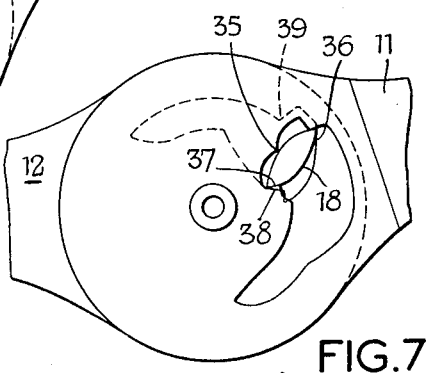

On the arm 11 being again pivoted clockwise, the frictionally-retained pawl again remains stationary at first, and the corner 31 of the slot 16 thus disengages from its one end. Its other end is then engaged by a wall portion 34, adjacent the wall portion 29, of the slot 16, and begins to move with the arm 11. This, together with the frictional retention of the pawl at its centre, causes the pawl to rotate clockwise into a third rotated position in which further rotation of the pawl is prevented by engagement with it of a corner 35 of the slot 16. The pawl then moves bodily with the arm 11 until, on becoming engaged with corners 36 and 37 of the slot 17 (as shown in FIGURE 7) it prevents further clockwise pivotal movement of the arm 11 relative to the arm 12.

Finally, on the arm 11 being again pivoted anticlockwise relative to the arm 12, a corner 38, adjacent the corner 31, of the slot 16 bears against the pawl near its one end and this, in conjunction with the frictional constraint on the pawl and/or engagement of the pawl near its other end (as shown in FIGURE 8) by a corner 39 of the slot 18, at the end of the wall portion 32 which is remote from the wall portion 33, rotates the pawl clockwise into a fourth rotated position in which it is generally aligned with the (arcuate) direction of relative pivotal movement of the arms 11 and 12. In this fourth rotated position, the pawl is aligned with the arcuate extensions 25 and 26 of the slots 16 and 17, and permits continued anticlockwise pivotal movement of the arm 11 relative to the arm 12 until all the parts are again in their relative positions shown in FIGURE 1.

It will be observed that the successive rotations of the pawl progressively into its first, second, third and fourth rotated positions result in its undergoing one half of one rotation. It will be appreciated also that certain portions of the walls of the slots 16 and 17 are specifically referred to above in connection with their active functions, and that the remaining wall portions are such as to give the requisite clearance for the pawl during its movements as described above.

The locking stay whose structure and operation are illustrated in FIGURES 1 to 8 has many applications, as will be readily appreciated. For example it can be used to support that part of the back of an estate car which opens upwardly and outwardly, as shown in FIGURE 9; it can be used to support a cabinet shelf, as shown in FIGURE 10; or it can be used to replace a conventional hinge on a skylight, as shown in FIGURE 11. Many other applications will readily spring to mind.

In FIGURE 9 is shown a moving member 40 which may be the rear window of an estate car secured by conventional hinges at 41 to a fixed frame 42. A locking stay 10 of the kind shown in FIGURES 1 to 8 is provided at each side of the moving member 40, only one locking stay being shown in the drawing, and the arms 11 and 12 of the locking stay are attached to the moving member 40 and the fixed frame 42 respectively.

When the moving member 40 is closed against the fixed frame 42 the locking stay 10 is also closed (as in FIGURE 4) and in the position shown in broken lines in FIGURE 9. As the moving member 40 is opened and lifted outwardly the stay mechanism is opened until, on reaching its position corresponding to FIGURE 5, it locks and prevents further upward movement of the member 40. On downward movement of the member 40 under gravity, the locking stay assumes the state shown in FIGURE 6 and holds the member 40 open, in the position shown in FIGURE 9. To lower the moving member 40 it is again lifted up through a small angle, to put the locking stay in its condition shown in FIGURE 7, and it is then possible for the member 40 to swing downwardly again into the fully closed position.

In FIGURE 10 a locking stay 10 is shown supporting a shelf 50 which forms part of a cabinet 51. The shelf 50 is designed to close downwardly into the cabinet and can be held locked in its horizontal position by locking stay 10. To lower the shelf 50 it is first lifted slightly to unlock the locking stay 10 whereupon it can be lowered and folded into the cabinet 51.

In FIGURE 11 is shown a skylight 60 secured to a roof 61 by means of a locking stay 10 which acts both as a prop and as a hinge for the skylight 60.

When the skylight 60 is rotated upwardly and then released, the stay 10 is rotated and then locked in the desired position. To close the skylight, it is first opened further, rotating and releasing the locking stay 10, and then closed.

The angle through which the locking stay 10 rotates before locking is determined by the length of the co-operating slots which accommodate the pawl, and can be varied to suit a particular application.

Figure 12:
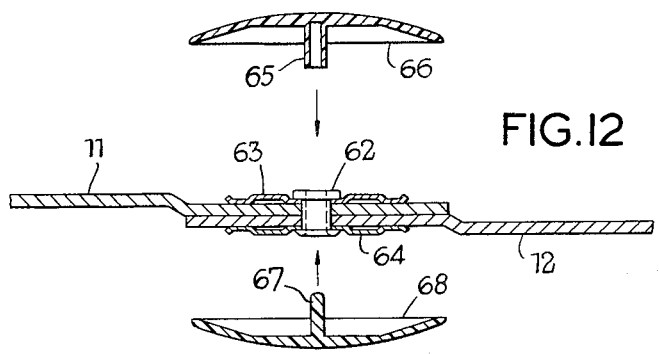
FIGURE 12 is a sectional view of a different locking stay according to the invention, generally similar to that shown in FIGURES 1 to 8 but embodying some modifications.

The two caps 19 and 20 in the locking stay 10 are preferably formed of resilient synthetic plastic material. The pivot pin 13 may as described above be a push fit into the bore in each cap, or if desired it may be moulded into one of the caps and a force fit into the other. The pivot pin 13 may also be replaced, if desired, by a bolt and nut and the caps may be made of metal and spring loaded. Again, the arms 11 and 12 may be pivotally secured together, as shown in FIGURE 12, by means of a rivet 62 which also secures in place two spring-steel discs 63 and 64 having pressed-out annular tracks which bear on opposite surfaces of the pawl (not shown). If desired, the rivet 62 may be keyed to the discs 63 and 64 and to one of the arms 11 and 12, to prevent rotation of the discs (thus tending to prevent movement of the pawl) relative to that one of the arms. The rivet 62 has a central bore into which fits a hollow central stud 65 of a cover cap 66; and a central stud 67 of a second cover cap 68 is a friction fit within the stud 65, to retain the cover caps, which are preferably of synthetic plastic material, in position.

It will be appreciated that although the arrangement illustrated in FIGURE 11, like that illustrated in FIGURES 1 to 8, provides for frictional engagement of the pawl between two surfaces which are pressed toward one another, other equivalent means may be provided. For instance, if only one such surface is provided for the pawl to bear against, the pressure may be achieved by providing that the surface and the pawl attract one another magnetically. The pawl may itself be a permanent magnet, provided on one side with a thin layer of brass if, surfaces of magnetisable material being provided adjacent both sides of the pawl, it is desired that the pawl should be held in frictional engagement with one of those surfaces rather than with the other.

The above-described embodiments are of locking stays having two relatively pivotable members, but the invention is equally applicable to a locking stay having two members linked together to permit, for example, relative rectilinear movement. Such an embodiment of the invention is illustrated in FIGURES 13 to 15.

Figure 13:
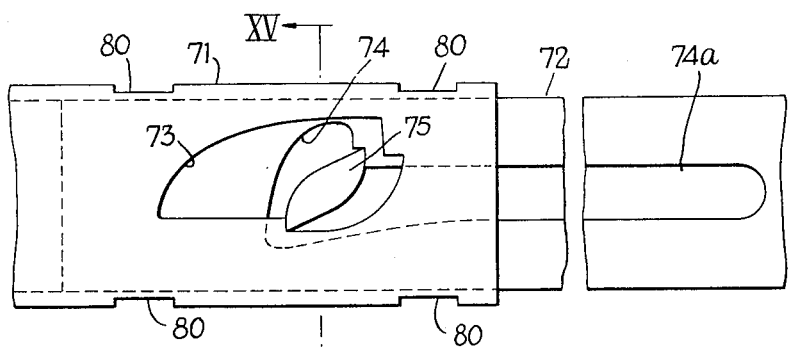
FIGURE 13 is an elevational view of a further locking stay according to the invention.
Figure 15:
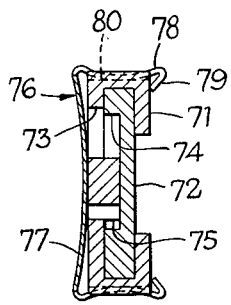
FIGURE 15 is a sectional view through the locking stay shown in FIGURE 13.
Figure 14:
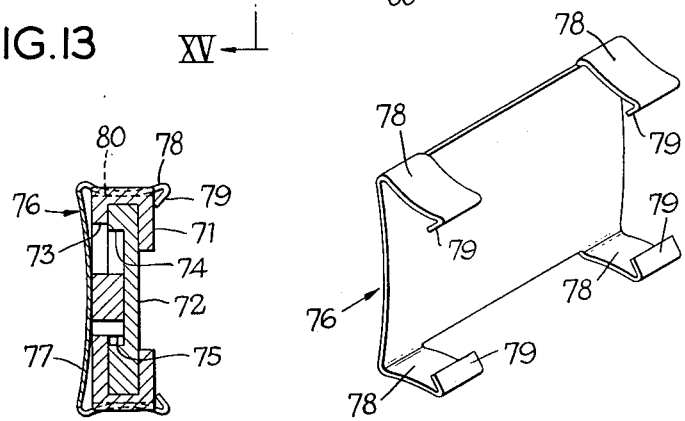
FIGURE 14 is a perspective view of a cover plate for the locking stay shown in FIGURE 13.

The locking stay of which the parts embodying the invention are shown in FIGURES 13 to 15 comprises a first member 71 which is of C-section channel shape and in which is linearly slidable a second member 72 in the form of a straight flat rod. The web face of the channel member 71 has formed in it an aperture 73, and the rod 72 is formed in its corresponding face with a recess 74 which includes an extension 74a extending along the rod 72 in the direction of (linear) relative movement between the channel member 71 and the rod 72. The recess 74 is partly in register with the aperture 73, and the thickness of a floating double-ended pawl 75 is accommodated partly in the aperture 73 and partly in the recess 74. The shapes of the aperture 73 and the recess 74 are clearly shown in FIGURE 13 and will not be described in detail; and in order that these shapes may be clearly seen, there is omitted from FIGURE 13 a spring cover plate 76 which comprises (as shown in FIGURE 14) a bowed central web 77 and four projecting fingers 78 with turned-over ends 79. In the assembled locking stay, the fingers 78 are sprung over the channel member 71 and engaged in grooves 80 thereof which prevent movement of the cover plate along the channel member. The fingers 78 bearing against the channel member (as shown in FIGURE 15) then hold the cover plate in tension with its bowed web 77 bearing against the pawl 75, so that the pawl is frictionally engaged both by the cover plate and by the bottom or rear surface of the recess 74.

No detailed description of the operation of this locking stay will be required, as this can be deduced from FIGURE 13. In FIGURE 13 the two members are shown in their extended position, locked by the pawl (in its "second rotated position" in terms of the above-description with reference to FIGURES 1 to 8) against retraction of the rod 72 into the channel member 71. A small relative extending movement first releases the ends of the pawl and then rotates the pawl to its third rotated position in which it blocks further extending movement but permits retraction of the rod 72 into the channel member 71. Retraction of the rod rotates the pawl into its fourth rotated position in which it is aligned with the direction of relative movement of the members 71 and 72, and the extent to which retraction is possible is determined by the length of the extension 74a of the slot 74. On the rod 72 being again withdrawn to extend fully from the channel member 71, the pawl is rotated into its first rotated position, and a slight subsequent retracting relative movement rotates the pawl into its illustrated second rotated position in which it prevents further retraction.

The sequence of events is thus, generally, the same as in the embodiment shown in FIGURES 1 to 8; but consideration of the somewhat different shapes of the slots 73 and 74 in FIGURE 13 will reveal that the interaction of various wall portions thereof with the pawl, to provide progressive rotation thereof, is somewhat different in detail from that described above with reference to FIGURES 3 to 8. More generally, it will be appreciated, the two illustrated arrangements of a double-ended pawl and two profiled slots co-operating therewith are but examples of the way in which a pair of suitably shaped slots may be made to rotate the pawl progressively in a locking stay according to the invention.

It will be appreciated that in any particular embodiment of the invention, the yielding constraint which is applied to the pawl, tending to retain it in its instantaneous position relative to one or other of the two major relatively movable members, may have an essential operative function in rotating the pawl from one to another of its successive rotated positions, or may, on the other hand, serve only to prevent the pawl from slipping out of one rotated position (e.g. under gravity) before it has been positively engaged by appropriate wall portions of the slots to move it into the next successive position.

The locking stay of which FIGURE 16 is a transverse sectional view is similar to that shown in FIGURES 13 to 15, comprising a similar C-section channel member 71 formed with a similar aperture 73 and a rod member, indicated 72' in FIGURE 16 which differs materially from the rod member 72 of FIGURES 13 to 15 only in that the recess 74' formed in it, with the same shape as the recess 74 of FIGURES 13 to 15, penetrates its whole thickness so that both sides of the pawl 75 are left uncovered. Instead of a spring clip 76 bearing against only one side of the pawl 75, therefore, the locking stay of FIGURE 16 is provided with a pair of channel-section caps 81 and 82 formed with mutually-engaging lips so that the two caps together embrace the member 71 and the member 72' slidable therein, each cap bearing against a respective side of the pawl 75. The caps, together, are a tight friction fit on the member 71 but are not in contact with the rod 72', and they therefore remain stationary relative to the member 71 and tend to hold the pawl 75 stationary relative thereto. The operation of the locking stay shown in FIGURE 16 is substantially the same as that of the stay shown in FIGURES 13 to 15, and no further description will be necessary for an understanding thereof.

What I claim is:

1. A locking stay comprising a first member and a second member connected together by connecting means which permits, between the members, a defined relative movement in a forward and a reverse direction, each member being formed with a surface overlying a surface of the other member and slidable thereover during said relative movement of the members, and each surface being formed with a slot partially overlying and in register with the slot of the other surface, there being provided, yieldingly constrained to maintain its instantaneous position but otherwise floating, a double-ended pawl having its thickness accommodated partly in one slot and partly in the other slot, the slots being formed with bounding walls so shaped that on successive relative movements of the members alternately in the forward direction and in the reverse direction the pawl is cammed by the walls successively into progressively rotated positions, the pawl being engaged by the walls of the two slots, in a first and a third of said rotated positions, to prevent further relative movement of the members in the forward direction and, in the second of said rotated positions, to prevent further relative movement in the reverse direction, and the pawl, in the fourth of its said rotated positions, being generally aligned with the permitted direction of relative movement and with an extension in that direction of at least one of the slots, said extension permitting movement of the extended slot and the associated member, relative to the aligned pawl and the other member, in the reverse direction to a relative position of the members which is substantially displaced, in the reverse direction of relative movement, from their relative position as limited, in that direction, by the pawl in its said second rotated position.

2. A locking stay as claimed in claim 1, wherein the connecting means includes a pivot member and the first and second members are arms pivotally connected thereby, the permitted defined relative movement between the members being one of relative rotation about a common pivotal axis.

3. A locking stay as claimed in claim 1, wherein the connecting means constrains the members to rectilinear movement relative to one another.

4. A locking stay as claimed in claim 1, wherein relative movement of the members twice in the forward direction and twice in the reverse direction, alternately, causes the pawl to be cammed progressively through one half of one rotation.

5. A locking stay as claimed in claim 1, wherein the pawl is held in frictional engagement with a surface fixed in position relative to the said one of the members and is thereby yieldingly constrained to maintain its instantaneous position relative thereto.

6. A locking stay as claimed in claim 5, wherein the frictional engagement of the pawl is maintained by means of a pressure member acting on the pawl.

7. A locking stay as claimed in claim 5, wherein the frictional engagement of the pawl is maintained by providing that the pawl and the surface which it frictionally engages attract one another magnetically.

References Cited in the file of this patent
UNITED STATES PATENTS 2,566,182    Flynn _____ Aug. 28, 1951

FOREIGN PATENTS 4,693    Great Britain _____ of 1879
355,556    Great Britain _____ Aug. 27, 1931